(No Model.)
W. LÜBBECKE.
TENSION AND COMPRESSION ROD FOR STRUCTURE PURPOSES.
No. 442,488. Patented Dec. 9, 1890.
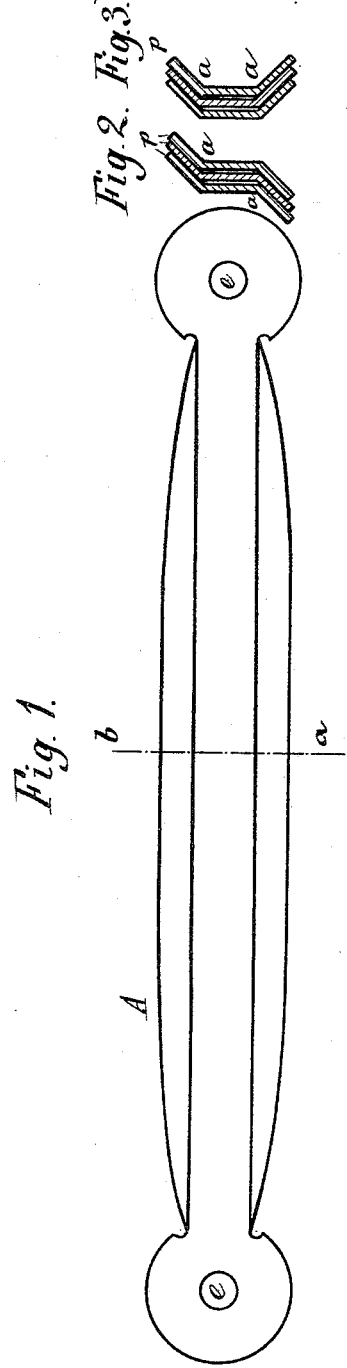
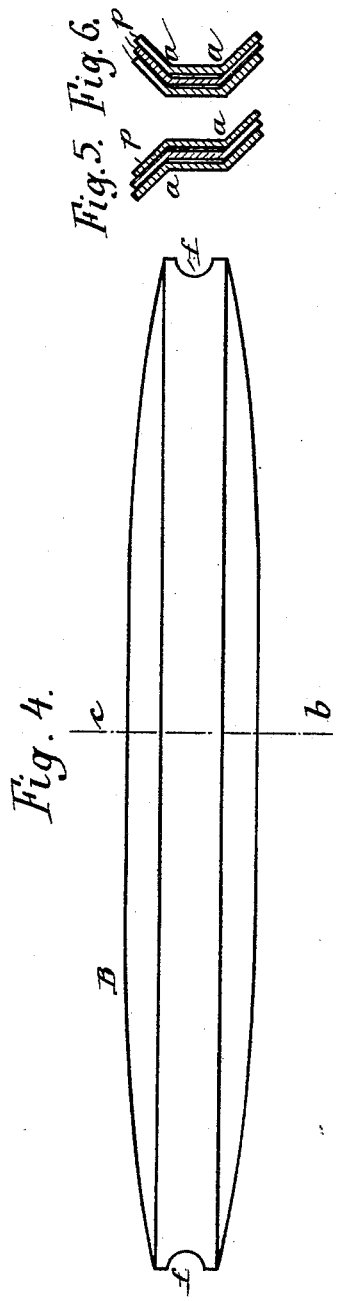
Witnesses
C. Sedgwick
J. M. Ritter
Inventor
W. Lübbecke
by Munn & Co.
Attorneys.

UNITED STATES PATENT OFFICE.

WILHELM LÜBBECKE, OF BERLIN, GERMANY.

TENSION AND COMPRESSION ROD FOR STRUCTURE PURPOSES.

SPECIFICATION forming part of Letters Patent No. 442,488, dated December 9, 1890.

Application filed March 27, 1890. Serial No. 345,535. (No model.)

*To all whom it may concern:*

Be it known that I, WILHELM LÜBBECKE, a subject of the King of Prussia, residing at Berlin, in the Kingdom of Prussia, Germany, have invented new and useful Improvements in Tension and Compression Rods for Structure Purposes, of which the following is a specification.

This invention relates to the manufacture of structural parts, consisting of tension and compression rods, which are formed as uniformly as possible, similarly to the flat rods hitherto used, and which may be employed in a similar manner. Structures of any kind consisting of such rods acting on pivot or joint bolts may be made so as to be readily put together and taken to pieces, like constructions composed of flat rods.

Reference is to be had to the accompanying drawings, forming a part of this specification, in which similar letters of reference indicate corresponding parts in the several views.

Figure 1 is a side elevation of a tension-rod constructed in accordance with my invention. Fig. 2 is a transverse section of the same, taken on the line $a\,b$ in Fig. 1. Fig. 3 is a similar view showing a modified form of the plates constituting the rod. Fig. 4 is a side elevation of a compression-rod constructed in accordance with my invention. Fig. 5 is a transverse section of the same, taken on the line $b\,c$ in Fig. 4; and Fig. 6 is a similar view showing the plates arranged as illustrated in Fig. 3.

The rods are made up of a series of metal plates $p$, which may be of the shape in cross-section shown in Figs. 2 and 5, or as shown in Figs. 3 and 6, having obtuse angles $a$, in order that they may be placed closely against each other; and said rods may be arranged in series, like chains consisting of flat links connected by pivot bolts, or be arranged to bear at their ends directly upon joint-bolts, according to the requirements of the structure in which they are employed. In the two cases the intermediate space left between the stems of the rods placed against each other may be reduced to zero, if desired, according to the size of the angles $a$. It is advantageous to leave on the rod A (shown in Fig. 1) an intermediate space equal to the thickness of a stem. In the case of the rod B (shown in Fig. 4) this space may be reduced to zero, so that the stems may be placed closely against each other. The flanges of the plates may be suitably shaped on a line of equal resistance to compressional strain in order to save weight.

The rods, whether constructed with eyes $e$, as shown in Fig. 1, or with grooved extremities $f$, as shown in Fig. 4, are of great value for homogeneous constructions and for the rapid building up of bridges for various purposes, bridge-piers, scaffolds, and the like. All such constructions may be made in their parts which are to be subjected to compression as readily capable of being taken to pieces as is the case when flat rods are used in the parts to be subjected to tension. As the structures can be strengthened at will by joining on additional rods, it is possible to construct with the same rod elements, railway-bridges, military bridges, street-bridges, foot-bridges, bridge-piers, scaffolds, &c., by joining as many rods as may be required for the tensional and compressional strain.

Generally, and in particular in American bridge construction, the tensile element of girder and suspension bridges usually consists of flat rods arranged the one close against the other; but in this case it has been found necessary to strut the upper parts. The resistance to be opposed by the joint-bolt against bending strain has generally been increased because, owing to the strutting, the force could not act so favorably as when the flat rods alone were employed in the tensile elements. The rods herein described are suitable for the same purpose, are of exactly the same width on the joint-bolt throughout all parts of the bridge, as in the case of pure chain elements, and do not require any supplemental strutting.

By the use of my improved rods the building of bridges is greatly simplified. For instance, a bridge may be constructed according to Neville's system, consisting of equilateral triangles, for which purpose generally only the rod shown in Fig. 1 may be used, the span being thirty meters and the bridge having a weight of five tons, when the fewest possible number of rods are applied in the under arch, upper arch, and diagonals. A bridge of the weight specified may be readily brought over the span by being pushed or drawn over the same, and the overhanging portions be balanced by counter-weights, or the bridge may be mounted on light hanging scaffolds. The bridge, owing to its light weight, sustains itself, and is strengthened gradually by adding rods until the required bearing strength is supplied, say from five tons to thirty tons.

The scaffolds may be made up similarly to the construction of the bridge, and when the bridge sustains itself the rods employed in the scaffold may be utilized to strengthen the bridge.

No special tools are required for use in connection with my improved rods, as they may be easily manipulated by hand. Thus both the expense of constructing or purchasing tools and the difficulties of transporting heavy structure pieces are reduced, which is of considerable importance in bridge construction in uncivilized countries, colonies, &c., and particularly in the construction of bridges in time of war.

Having now fully explained and ascertained the nature of my said invention and in what manner the same may be performed, I declare that what I claim is—

1. A tension and compression rod for structure purposes, composed of a series of parallel metal plates bent longitudinally at obtuse angles, said rod adapted to receive joint or pivot bolts at its extremities, substantially as shown and described.

2. A tension and compression rod for structure purposes, composed of a series of parallel metal plates oppositely bent longitudinally at obtuse angles, said rod adapted to receive joint or pivot bolts at its extremities, substantially as shown and described.

In testimony whereof I have signed my name to this specification in the presence of two subscribing witnesses.

WILHELM LÜBBECKE.

Witnesses:
   EDUARD PEITZ,
   L. GRAMBOUR.